United States Patent
Carey et al.

(10) Patent No.: US 7,491,274 B2
(45) Date of Patent: *Feb. 17, 2009

(54) NON-CHROME METAL TREATMENT COMPOSITION

(75) Inventors: William S. Carey, Wallingford, PA (US); Michael T. Raab, Langhorne, PA (US); Edmund P. Szwajkowski, Bensalem, PA (US); Jeffrey I. Melzer, Lansdale, PA (US)

(73) Assignee: Chemetall Corp., Providence, NJ (US)

( * ) Notice: Subject to any disclaimer, the term of this patent is extended or adjusted under 35 U.S.C. 154(b) by 503 days.

This patent is subject to a terminal disclaimer.

(21) Appl. No.: 10/977,587

(22) Filed: Oct. 29, 2004

(65) Prior Publication Data

US 2006/0090818 A1    May 4, 2006

(51) Int. Cl.
    $C23C\ 22/00$    (2006.01)
(52) U.S. Cl. .................................. 148/250; 427/427.4
(58) Field of Classification Search ................. 148/247, 148/261, 250, 251; 427/427.4
    See application file for complete search history.

(56) References Cited

U.S. PATENT DOCUMENTS

| | | | |
|---|---|---|---|
| 2,926,116 A | 2/1960 | Keim | |
| 2,926,154 A | 2/1960 | Keim | |
| 4,051,110 A | 9/1977 | Quinlan | |
| 4,416,729 A | 11/1983 | Killat et al. | |
| 4,673,702 A | 6/1987 | Iacoviello | |
| 4,857,205 A | 8/1989 | Redmore | |
| 4,859,527 A | 8/1989 | DiStefano | |
| 4,962,141 A | 10/1990 | Iacoviello et al. | |
| 5,120,259 A | 6/1992 | Nakata et al. | |
| 5,282,905 A | 2/1994 | Reichgott et al. | |
| 5,344,505 A | 9/1994 | Ouyang et al. | |
| 5,614,597 A | 3/1997 | Bower | |
| 5,644,021 A | 7/1997 | Maslanka | |
| 5,668,246 A | 9/1997 | Maslanka | |
| 5,716,603 A | 2/1998 | Chen et al. | |
| 6,197,880 B1 | 3/2001 | Nigam | |
| 6,203,854 B1 | 3/2001 | Affinito | |
| 6,514,458 B1 | 2/2003 | Czechowski et al. | |
| 6,758,916 B1 | 7/2004 | McCormick | |
| 2004/0020565 A1 | 2/2004 | Melzer et al. | |
| 2004/0062873 A1 | 4/2004 | Jung et al. | |

FOREIGN PATENT DOCUMENTS

| | | |
|---|---|---|
| EP | 0330 413 A2 | 2/1989 |
| EP | 0330 413 A3 | 2/1989 |
| WO | WO 98/06512 | 5/1997 |
| WO | WO 99/19083 A1 | 4/1999 |
| WO | WO 00/71626 A1 | 11/2000 |
| WO | WO 0231065 A2 | 4/2002 |
| WO | WO 03/102034 A1 | 12/2003 |
| WO | WO 01/04224 A1 | 1/2004 |
| WO | WO 2004/042114 A2 | 5/2004 |
| WO | WO 2004/046421 A1 | 6/2004 |

OTHER PUBLICATIONS

National Coil Coaters Association, Technical Bulletin 4.2.9, *NCCA Technical Bulletin 4.2.9 (Formerly NCCA No. 11-23), Test Method for Evaluation of Adhesion and Flexibility by the Draw Method*, Jun. 1996 (3 pages).
National Coil Coaters Association, Technical Bulletin 5.4.4, *NCCA Technical Bulletin 5.4.4 Guidelines for 100% Relative Humidity Testing*, Jun. 1996 (2 pages).
ASTM D2247-97 *Standard Practice for Testing Water Resistance of Coatings in 100% Relative Humidity*, 1997, pp. 233-237.
ASTM D4585-97 *Standard Practice for Testing Water Resistance of Coatings Using Controlled Condensation*, 1997, pp. 547-549.
Silquest A-1100 silane, Material Safety Data Sheet No. 03350, OSI Specialties, Inc., Jul. 9, 1997 (9 pages).
NeoCAR™ Latex 2535, Union Carbide Corporation, Material Safety Data Sheet No. 2077, Sep. 15, 1999 (11 pages).
UCAR™ Latex 651, MSDS #1924 for Union Carbide Corporation, Jun. 26, 2000 (13 pages).
OSi Specialties, Crompton Corporation, Material Safety Data Sheet No. 1503, for Silquest A-1100 silane, Dec. 5, 2000 (11 pages).
Pluronic® L101 Surfactant—NCS 586470, MSDS for BASF Corporation revised Sep. 17, 2002 (5 pages).
UCAR™ Latex 651, 215 Liter Plastic Drum, Certificate of Analysis for The Dow Chemical Company, Oct. 13, 2003 (1 page).
Corrosion, L.L. Sheir, R.A. Jarman, GT Burstein, Eds. (3rd Edition, Butterworth-Heinemann Ltd. Oxford 1994), vol. 2, Chapter 15.3 *(We will forward a copy of this reference to USPTO when received same from inventors).
Billmeyer, *Textbook of Polymer Science*, New York, NY, John Wiley & Sons 1984; Chapter 2 *(We will forward a copy of this reference to USPTO when received same from inventors).
Moedritzer et al., *J. Org. Chem.* 31, pp. 1603-1607 (1966) *(We will forward a copy of this reference to USPTO when received same from inventors).
Silquest A-1230 silane, Material Safety Data Sheet, GE Silicones, Jul. 26, 2003 (8 pages).
Huntsman Corporation, Technical Bulletin, *The Jeffamine® Polyoxyalkyleneamines*, 2002 (6 pages).

*Primary Examiner*—Roy King
*Assistant Examiner*—Weiping Zhu
(74) *Attorney, Agent, or Firm*—McAndrews, Held & Malloy, Ltd.

(57) ABSTRACT

Chromate-free treatments and compositions for applying a conversion or passivation coating for metals, more particularly zinc coated metal surfaces. The methods of the invention comprise contacting the requisite metal surface with a phosphonomethylated polyamine. Other aspects of the invention involve methods and compositions in which the following optional components can be included: fluoacid, silane, inorganic phosphorus, acid, latex film forming component and pH adjustment agent.

11 Claims, No Drawings

NON-CHROME METAL TREATMENT COMPOSITION

FIELD OF THE INVENTION

The present invention relates to non-chrome containing coatings for metals. More particularly, the present invention relates to non-chromate coatings for zinc coated metal surfaces to improve the corrosion resistance of the treated metal. The invention provides a dried in place coating which is particularly effective at treating zinc coated, aluminum coated, or aluminum-zinc alloy coated, steel coil strip.

BACKGROUND OF THE INVENTION

It is well known to those skilled in the art to employ a chromate conversion or passivation coating on the surface of galvanized steel to impart improved corrosion resistance of bare and painted metal, improve adhesion of coatings, and for aesthetic purposes. For example see *Corrosion*, L. L. Sheir, R. A. Jarman, G. T. Burstein, Eds. (3$^{rd}$ Edition, Butterworth-Heinemann Ltd, Oxford, 1994), vol. 2, chapter 15.3.

Growing concerns exist regarding the toxicity profile of chromium and the pollution effect of chromates discharged into rivers and waterways by such processes. Because of the high solubility and the strongly oxidizing character of hexavalent chromium ions, conventional chromate conversion processes require extensive water treatment procedures to control their discharge. In addition, the disposal of the solid sludge from such waste treatment procedures is a significant problem.

Accordingly, there is a need in the art to provide an effective non-chromate treatment to provide dried in place conversion or passivating coating to inhibit metal surface corrosion and enhance adhesion of paint on or other coatings that may be applied to the surface.

Numerous compositions for providing non-chromate conversion coatings for galvanized steel are known to those skilled in the art.

SUMMARY OF THE INVENTION

The present invention pertains to a method for treating the surface of galvanized metals, such as steel, to provide for the formation of a conversion or passivating coating which increases the corrosion resistance of bare or painted metal, adhesion properties of painted metal, and/or the lubricity properties of unpainted metal. The methods of this invention comprise contacting the requisite galvanized metal surface with (a) phosphonomethylated polyamine. The metal surface treatment may also contain one or more of the following: (b) a fluoacid, (c) a silane, (d) an inorganic phosphorous acid, (e) a latex polymer film-forming component, and (f) a lubricity additive. After contact of the metal surface with the above treatment, the treatment is then dried in place to form the desired passivation coating.

Other objects and advantages of the invention will be apparent from the following description and appended claims.

DETAILED DESCRIPTION

In accordance with the present invention, it has been discovered that chrome-free conversion or passivation coatings can be provided on metal surfaces, especially galvanized metal surfaces such as hot dipped galvanized, electrogalvanized, and Galvalume® steel surfaces, by contacting the desired surface with an aqueous solution or dispersion comprising a phosphonomethylated polyamine. Especially effective are aqueous solution or dispersion formulations including: (a) a phosphonomethylated polyamine, (b) a fluoacid, (c) a silane, (d) an inorganic phosphorus acid, and optionally (e) a latex polymeric film component and/or (f) a lubricity additive. Aqueous pretreatment compositions of the invention provide improved corrosion resistance of bare and painted metal, adhesion of applied coatings to painted metal, and lubricity of bare metal. In the context of the invention, the term "bare metal" refers to metal surfaces that are treated with the conversion or passivation coating composition of the invention but which have not painted.

The phosphonomethylated polyamine compound (a) useful in the invention can be prepared by 1) polymerization of an amino containing compound with a bridging reagent capable of linking the amino compounds together, with the proviso that the resulting polyamine amine intermediate consists of amino hydrogen functionality, and then 2) phosphonomethylation of all or some of the available amino hydrogens. A structural representation of the phosphonomethylated polyamine compound is given by Formula I

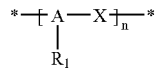

Formula I wherein "A" is the segment formed from polymerization of one or more amine containing monomers; "X" is the segment formed from polymerization of one or more bridging reagents capable of linking said amino compounds together; n is from about 1 to about 50,000; $R_1$ is selected from the group —H, substituted or non-substituted $C_1$-$C_{18}$ alkyl or aryl, poly[alkylene oxide], —$CH_2$—$PO(OR_2)_2$, or mixtures thereof; $R_2$ is —H or a water-soluble cation; with the proviso that at least 20% of $R_1$ is —$CH_2$—$PO(OR)_2$. Molecular weight and viscosity of the phosphonomethylated polyamine are not critical provided that the polyamine is either water-soluble or water dispersible.

Exemplary amino compounds encompassing segment "A" include, but are not limited to, diamine compounds comprising two primary amine functionalities, such as 1,2-ethylenediamine, 1,3-propylenediamine, 1,3-diamino-2-hydroxypropane, 1,4-butylenediamine, 1,6-hexamethylenediamine, 2-methyl-1,5-pentanediamine, trimethyl hexamethylenediamine, 1,2-diaminocyclohexane, and 3-amino-3,5,5-trimethylcyclohexylamine; polyamines, such as diethylenetriamine, bis(hexamethylenetriamine), triethylenetetraamine, and tetraethylenepentaamine; primary amines, such as ethanolamine, allylamine, benzylamine, and laurylamine; polyetheramines, such as the Jeffamine® series of products available from Huntsman Corporation and the DPA and PA series of products available from Tomah Products, Inc.; amino acids, such as glycine, alanine, glucosamine, and iminodiacetic acid; mixtures of any of the foregoing and the like.

Exemplary bridging reagents encompassing segment "X" include, but are not limited to, epihalohydrins such as epichlorohydrin and 1,2-epoxy-4-chlorobutane; (cyclo)alkylene dihalides such as ethylenedichloride, 2-chloroethyl ether, and 1,2-dichlorocylcohexane; diepoxides such as 1,2,7,8-diepoxyoctane and digyclidyl ether; mixtures of any of the foregoing and the like.

In accordance with the present invention, the repeat unit of the polyamine formed between the polymerization of "A"

with "X" contains, at minimum, 100 mole % N—H (hydrogen amino) functionality per mole of "A". For example, in the theoretical polymerization of an equal molar amounts of ethylenediamine with "X" as shown in Formula II the mole % N—H content would be calculated as follows: Mole % N—H functionality=2/1*100=200%. If 50 mole % of the ethylenediamine was replaced with dimethylamine as shown in Formula III the mole % N—H content would be calculated as follows: Mole % N—H functionality=2/2*100=100%.

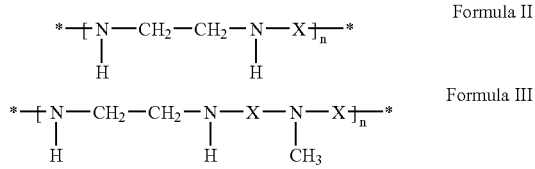

Formula II

Formula III

In one aspect of the invention, the amino compounds encompassing segment "A" comprise a molar percentage of diamine to primary amine from about 100:0 to 75:25; the bridging reagents encompassing segment "X" is an epihalohydrin; and $R_1$ is as previously described.

In a particularly preferred embodiment, the bridging reagent is an epihalohydrin, preferably epichlorohydrin and the resulting phosphonomethylated polyamine is an N-phosphonomethylated amino-2-hydroxypropylene polymer of the type reported in U.S. Pat. No. 4,857,205 (incorporated herein by reference) and having the formula

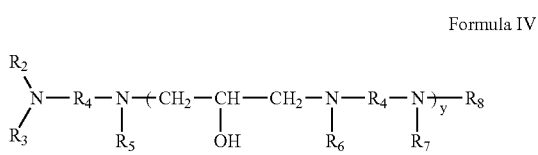

Formula IV wherein $R_2$, $R_3$, $R_5$, $R_6$, $R_7$, and $R_8$ are independently selected from hydrogen and phosphonomethylated radical corresponding to the formula —$CH_2PO(OH)_2$ with the proviso that at least 20% of $R_2$, $R_3$, $R_5$, $R_6$, $R_7$, and $R_8$ are $CH_2PO(OH)_2$ or water-soluble or water dispersible salts thereof, $R_4$ is a divalent radical selected from the group consisting of (a) unsubstituted alkylene groups having at least about 2 and at most about 12 carbon atoms; (b) substituted alkylene groups having at least about 2 and at most about 12 carbon atoms wherein at least one hydrogen of the alkylene group is substituted with a radical selected from the group consisting of methyl, ethyl, propyl, butyl, methyl ammonium, ethyl ammonium and ammonium groups, and the other hydrogens of the substituted alkylene group are unsubstituted; (c) cyloalkylene groups having at least 3 and at most about 12 carbon atoms; (d) oxyalkylene groups wherein the alkylene moiety has from about 1-12 carbon atoms, or ethylene oxide and/or propylene oxide groups such as those provided by Huntsman Jeffamine® and Tomah® Inc. polyetheramines products; and (e)

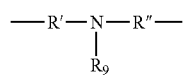

where $R_9$ is defined as $R_2$, $R_3$, $R_5$, $R_6$, $R_7$, and $R_8$ above with the provisio that at least 20% of $R_2$, $R_3$, $R_5$, $R_6$, $R_7$, and $R_8$ are $CH_2PO(OH)_2$ or water-soluble or water dispersible salts thereof, and R' and R" are independently selected from the group consisting of such unsubstituted alkylene groups, such substituted alkylene groups, and such cycloalkylene groups. In Formula IV, y is between about 1 and about 50,000. Again, molecular weight and viscosity are not critical as long as the resulting phosphonomethylated polyamine is water-soluble or dispersible in water.

Preferably, $R_4$ in Formula IV is a straight chain alkylene group wherein the hydrogens of the alkylene group are unsubstituted or wherein at least one of the hydrogens of the alkylene group is substituted with a methyl, ethyl, propyl, butyl, methyl ammonium, ethyl ammonium or ammonium group. If at least one of the hydrogens is so substituted, preferably the other hydrogens of the alkylene group are unsubstituted. Particularly preferred —N—$R_4$—N— groups are based on alkylenediamines, including hexamethylenediamine, 1,4-butylenediamine, 1,2-ethylenediamine, 3-methylpentamethylenediamine and 2-methylpentamethylene-diamine. However, where —N—$R_4$—N— is derived from a triamine, preferred alkylene triamines include diethylenetriamine.

The phosphonomethylated polyamine compound (a) of the present invention can be prepared via a multi-step process involving first the polymerization of amino compounds with a bridging reagent capable of linking together the amino compounds such that the resulting polyamine intermediate contains, at minimum, 100 mole % N—H (amino hydrogen) functionality per mole of amine. Such reactions, referred to as step-reaction (i.e., condensation) polymerizations, are known to those skilled in the art, for example, see Billmeyer, *Textbook of Polymer Science*, (New York, N.Y., John Wiley & Sons, 1984), chapter 2. Secondly, the polyamine intermediate is then phosphonomethylated by reaction with an aldehyde, preferably formaldehyde or paraformaldehyde, and an inorganic phosphorus compound, preferably phosphorus acid. Such phosphonomethylation reactions are also known to those skilled in the art, for example, see Moedritzer et al., *J. Org. Chem.*, 31, pp 1603-1607 (1966).

It is to be understood that the aforementioned synthesis methods do not in any way limit the synthesis of the phosphonomethylated polyamine compound (a) of the present invention. For example, one skilled in the art can envision preparation of polyamines such as, inter alia, poly[diallylamine] via radical chain (i.e., addition) polymerization that, upon phosphonomethylation, can increase the corrosion resistance of metal surfaces.

The phosphonomethylated polyamine compound of the present invention can be utilized as produced or it may be purified by methods know to those skilled in the art. For example, the phosphonomethylated polyamine compound can be subjected to distillation, precipitation, liquid extraction, solids extraction (e.g., activated carbon), or the like techniques to minimize the presence of residual reactants and/or by-products.

The methods of the invention comprise contacting a galvanized metal surface with water-soluble or water-dispersible treatment compositions comprising the phosphonomethylated polyamine and then drying the passivation coating in place. More particularly the compositions of the invention comprise: (a) a phosphonomethylated polyamine, (b) a fluoacid, (c) a silane, and (d) an inorganic phosphorus acid. The treatment composition may also include (e) a latex polymeric film component and/or (f) a lubricity additive.

The fluoacid component preferably is a fluoacid of a Group IVB metal or mixtures thereof and the like. Preferred are fluotitanic acid, fluozirconic acid, and mixtures thereof. Particularly preferred is fluotitanic acid, i.e., $H_2TiF_6$.

The silanes component can comprise alkoxysilanes and aminosilanes such as those taught by Affinito U.S. Pat. No. 6,203,854, silane derivatives of polyethyleneglycol, and mixtures thereof and the like. Preferred are 3-aminopropyl silane and poly[oxy-1,2-ethanediyl], α-methyl-ω-(3-propenylsiloxane); for example, Silquest A-1100 and Silquest A-1230 commercially available from GE Silcones, respectively. Particularly preferred is Silquest A-1230, which is generically referred to as a polyalkyleneoxidealkoxysilane.

The inorganic phosphorus acid can comprise phosphoric acid, phosphorous acid, hypophosphorous acid, salts thereof, and mixtures thereof and the like. Preferred is phosphoric acid and salts thereof.

The polymeric latex film component can be chosen from a wide variety of materials such as styrene acrylates, styrene butadienes, vinylacetates, urethanes, mixtures thereof and the like. Some commercially available latex examples include Union Carbide NeoCar 2353, 2300, and UCar 651 resins; and Air Products Airflex 500, 4514, 4500, 4530, Flexhane 620, and Vinac 884 resins.

Inorganic and organic lubricity additives are know to those skilled in the art and can comprise graphite, molybdenum sulfide, boron nitride, paraffin, phosphate esters, synthetic polyethylene and/or polypropylene polymers including halogenated analogs, and other natural and synthetic waxes. Preferred are waterborne wax dispersions and emulsions; for example, Michem® Lube 188F and Michem® Lube 160PF commercial available from Michelman Incorporated.

At present, the preferred methods of the invention comprise contacting a galvanized metal surface with water-soluble or water-dispersible treatment compositions consisting of (a) a phosphonomethylated polyamine, (b) a fluoacid, (c) a silane, (d) an inorganic phosphorus acid, and optionally (e) a latex polymeric film and/or (f) a lubricity component. It is to be understood that compositions of the present invention possibly do not require the presence of all of the components (b), (c), and (d) with the limitation that they must contain the phosphonomethylated polyamine (a) as defined herein.

Compositions in accordance with the invention are chromate free and include

| (a) | 0.01-40 wt % | phosphonomethylated polyamine |
| (b) | 0.00-40 wt % | fluoacid |
| (c) | 0.00-20 wt % | silane |
| (d) | 0.00-50 wt % | inorganic phosphorus acid |
| (e) | 0.00-40 wt % | film forming latex |
| (f) | 0.00-5 wt % | lubricity additive | remainder water and pH adjustment agent, wherein the weight of the composition is, in total, 100 wt %.

More preferred are compositions having the following range (in wt %) of the components

| (a) | 0.01-40 wt % | phosphonomethylated polyamine |
| (b) | 1-30 wt % | fluoacid |
| (c) | 0.01-20 wt % | silane |
| (d) | 1-30 wt % | inorganic phosphorus acid |
| (e) | 0.00-40 wt % | film forming latex |
| (f) | 0.00-5 wt % | lubricity additive | remainder water and pH adjustment agent.

Based on presently available data, a composition that is most highly preferred at present is

| (a) | 15 wt % | phosphonomethylated polyamine; reaction product of hexamethylenediamine, epichlorohydrin and $H_3PO_4$, see Example 1 infra. |
| (b) | 3.60 wt % | fluotitanic acid |
| (c) | 1.00 wt % | silane - Silquest 1230 |
| (d) | 6.375 wt % | $H_3PO_4$ |
| (e) | not present | film forming latex |
| (f) | not present | lubricity additive |
| (f) | 2.15 wt % | $NH_4OH$; pH adjustment agent. | remainder water.

The sum of all components of the composition equals 100 wt %. The pH of the compositions should be less than or equal to about 6.

The requisite metal surface may be contacted by the treatment in spray, immersion, or roller applications. The treatment is then dried, and the metal surface is ready for painting or other coating applications.

The conversion or passivation treatment the present invention is applied to result in a conversion coating weight of greater than about 1 milligram per square foot to the treated surface with a weight of about 2-500 milligrams per square foot being more preferred. For use in commercial applications, working solutions comprising about 3-100 wt %, preferably 10-100 wt % concentrations of the above formulations are used to contact the desired metal surfaces.

EXAMPLES

The invention will now be described in conjunction with the following examples which are to be regarded as being illustrative of certain embodiments of the invention but should not be viewed to restrict the scope of same.

Example 1

General Preparation Method of the Phosphonomethylated Polyamine

To a suitable reaction vessel equipped with a mechanical stirrer, thermocouple, addition ports, nitrogen sparge, and a water-cooled condenser is charged a 30 wt % solution of 1,6-hexamethylenediamine. The solution is sparged with nitrogen to inert the reactor, then the vessel is configured to have a nitrogen blanket. The reactor contents are then heated to 95±2° C. and epichlorohydrin is added in portions until a significant increase in the batch viscosity is observed. The total amount of epichlorohydrin utilized is typically 83 mole % of the 1,6-hexamethylenediamine charge. The epichlorohydrin portions are 50%, 25%, 15%, then 5% of the theoretical total until the desired viscosity is achieved. The first epichlorohydrin portion is charged over a 1-hour period, and that addition rate is maintained for the next two additions. All additions thereafter are added shot wise. The batch is held at temperature for 15-20 minutes between epichlorohydrin portion additions. Once a viscous solution is achieved, typically determined by observing the loss of a vortex, water is charged to the reaction vessel to yield a nominal 38 wt % solids solution. The batch is held at 95±2° C. after addition and the viscosity is allowed to increase. Then, again after the batch is observed to become viscous, water and a molar equivalent of aqueous phosphoric acid relative to the hexamethylenediamine charge are added to yield a nominal 40% solids aqueous solution. The batch is then held at 95±2° C. for 30 minutes, then is cooled to room temperature. The typical viscosity of the polyamine intermediate ranged from 500-1,500 cps, and the typical pH ranged from 4.0 to 4.6. The mole reactive N—H/g product is nominally 0.0032 as determined by the following equation: [(moles 1,6-hexamethylenediamine*4)−(moles epichlorohydrin charged*2)]/batch weight.

The batch is then adjusted to pH 1.5-1.8 with 32 wt % aqueous hydrochloric acid, typically 18 mole % of the reactive N—H content. 70 wt % Aqueous phosphorous acid, corresponding to 75 mole % of the reactive N—H content, is charged to the reactor vessel and the batch is heated to 85±2° C. An equal molar amount of 37 wt % aqueous formalin, relative to the phosphorous acid charge, is then added drop wise over a 1-hour period. After addition, the batch is heated to 93±2° C. and held for 6 hours. The batch is then cooled to room temperature, adjusted to nominally 40 wt % solids with water, and collected. The typical viscosity of the resulting phosphonomethylated polyamine compound of the invention ranged from 35-45 cps, and the typical pH was less than 1.0. Based on $^{31}P$ NMR analysis the fate of the hypophosphorous acid was as follows: ~55 mole % phosphonomethylation product, 25 mole % residual, and 20 mole % oxidized to phosphoric acid. This corresponds to a nominal conversion of reactive N—H functionality to —$CH_2$—$PO_3H_2$ functionality of 41.25 mole %.

Example 2

Metal Passivation Demonstration

Test panels of G70/70 hot dipped galvanized (HDG) from ACT Laboratories and Galvalume® from Steelscape Inc. were prepared by spray cleaning with 3 wt % of an aqueous alkaline surfactant product (GE Betz Kleen 132), rinsed with tap water followed by DI water, then dried. A solution consisting of 15.0 wt % of the phosphonomethylated polyamine compound of Example 1, 8.5 wt % of 75 wt % aqueous phosphoric acid, 6.3 wt % of 26 Be Ammonium Hydroxide, 6.0 wt % of 60 wt % aqueous fluotitanic acid, 1.0 wt % Silquest A-1230 (a polyalkyleneoxide alkoxysilane commercially available from GE Silicones), and the balance water was applied to the panels utilizing a reverse roll coater. The treated panels were then dried in an oven at 450° F. to peak metal temperatures (PMT) of 200° F. The average coating weight of the panels were determined by measuring the Ti count expressed as mg/ft$^2$: 9.16 for the HDG sample set and 6.60 for the Galvalume® set. The treated panels were evaluated in Neutral Salt Spray (NSS) test according to ASTM B-117 and rated at various intervals according to ASTM D-1654 relative to benchmark chrome-based treatment programs.

As demonstrated in Table 1, the phosphonomethylated polyamine formulation of the present invention provided corrosion inhibition equal to or greater than the benchmarked chrome based formulation on HDG metallurgy. Tables 2 and 3 demonstrate the phosphonomethylated polyamine formulation of the present invention provided corrosion inhibition equal to or slightly less than the benchmarked chrome based formulation on Galvalume®. It is noted that the formulation of the present invention absent the phosphonomethylated polyamine component results in significant white rust (>50% in 96 hours) for both HDG and Galvalume®.

TABLE 1

HDG NSS % White Rust

| Hours | Treatment | # of Panels | Average |
|---|---|---|---|
| 96 | Non-Chrome | 100 | 0.26 |
| 264 | Non-Chrome | 90 | 4.71 |
| 432 | Non-Chrome | 90 | 27.03 |
| 96 | Chrome | 56 | 0.52 |
| 264 | Chrome | 50 | 38.92 |
| 432 | Chrome | 50 | 76.24 |

TABLE 2

Galvalume® NSS % White Rust

| Hours | Treatment | # of Panels | Average |
|---|---|---|---|
| 336 | Non-Chrome | 100 | 0.00 |
| 600 | Non-Chrome | 100 | 0.00 |
| 1008 | Non-Chrome | 82 | 0.46 |
| 336 | Chrome | 56 | 0.00 |
| 600 | Chrome | 56 | 0.05 |
| 1008 | Chrome | 56 | 0.45 |

TABLE 3

Galvalume® NSS % Black Rust

| Hours | Treatment | # of Panels | Average |
|---|---|---|---|
| 336 | Non-Chrome | 100 | 1.57 |
| 600 | Non-Chrome | 100 | 2.10 |
| 1008 | Non-Chrome | 82 | 8.18 |
| 336 | Chrome | 56 | 0.14 |
| 600 | Chrome | 56 | 0.48 |
| 1008 | Chrome | 56 | 1.11 |

Example 3

Metal Passivation Demonstration

As in Example 2 except the Silquest A-1230 was substituted with an equal weight amount of Silquest A-1100 (a aminopropyl alkoxysilane commercially available from GE Silicones). In this example the four Galvalume® panels each (average coating weight 5.98 mg Ti/ft$^2$) were dried to a PMT of 150° F. and 200° F. and evaluated for NSS as well as the QCT Condensing Humidity test according to ASTM D-4585 and an internal wet pack test (WPT, a minimum of 6 wetted panels with the treated side facing each other are stacked under 15 ft/lb in$^2$ pressure and placed in a 100% humidity cabinet at 100° F. and are evaluated periodically for the appearance of rust, 0% rust=perfect) to simulate storage of coil under humid conditions. The results of this testing summarized in Table 4 demonstrate the robustness of the phosphonomethylated polyamine formulation of the present invention with regard to cure temperature.

TABLE 4

Galvalume® PMT vs. % Black Rust (BR) & % White Rust (WR)

| Hours | PMT ° F. | NSS % WR | NSS % BR | QCT % WR | WPT % WR |
|---|---|---|---|---|---|
| 504 | 150 | 0.00 | 0.75 | | |
| 744 | 150 | 0.00 | 3.50 | | |

TABLE 4-continued

Galvalume ® PMT vs. % Black Rust (BR) & % White Rust (WR)

| Hours | PMT ° F. | NSS % WR | NSS % BR | QCT % WR | WPT % WR |
|---|---|---|---|---|---|
| 1008 | 150 | 0.00 | 12.50 | 1 | 0 |
| 504 | 200 | 0.00 | 1.25 | | |
| 744 | 200 | 0.00 | 4.25 | | |
| 1008 | 200 | 0.00 | 11.25 | 1 | 0 |

Example 4

Lubricity Demonstration

The coefficient of kinetic friction (CoKF) measured for a number of commercially available chrome based programs via an in-house method was found to range between 0.12-0.17 units. The data in Table 5 demonstrates that the lubricity characteristics for the Example 2 composition of the present invention formulated with Silquest A-1230 are very comparable to chrome-based programs; whereas, the Example 3 composition of the present invention formulated with Silquest A-1100 is not significantly different than the cleaned only metal. The CoKF for the formulation of Example 3 topped off with 2 wt % of Michem® Lube 188F and Michem® Lube 160PF, commercial available from Michelman Incorporated, was evaluated and found to be 0.04 and 0.18 on treated HDG, respectively.

TABLE 5

| Metal | Treatment | CoKF |
|---|---|---|
| Galvalume ® | Cleaned Only | 0.58 |
| Galvalume ® | Example 2 | 0.15 |
| Galvalume ® | Example 3 | 0.50 |
| HDG | Cleaned Only | 0.60 |
| HDG | Example 2 | 0.13 |
| HDG | Example 3 | 0.56 |

Example 5

A phosphonomethylated polyamine was prepared according to the method of Example 1 except 2.34 mole % of the 1,6-hexamethylenediamine charge was substituted with dodecylamine. The resultant product was formulated according to Example 3 and utilized to treat six panels each of Galvalume® and HDG at a PMT of 200° F. The average coating weights, expressed as mg Ti/ft$^2$, were 6.04 and 7.99, respectively. The testing results summarized in Table 6 demonstrate the effectiveness of this formulation to inhibit corrosion of galvanized metal.

Example 6

A phosphonomethylated polyamine was prepared according to the method of Example 1 except 4.94 mole % of the 1,6-hexamethylenediamine charge was substituted with Jeffamine® XTJ-506, a polyetheramine available from Huntsman Corporation. This product has a mole ratio of PO/EO of about 3/19 and a reported mw of about 1,000. Generically, the Jeffamine® products are referred to generically as polyoxyalkyleneamines. The resultant product was formulated according to Example 3 and utilized to treat six panels each of Galvalume® and HDG at a PMT of 200° F. The average coating weights, expressed as mg Ti/ft$^2$, were 6.95 and 9.40, respectively. The testing results summarized in Table 6 demonstrate the effectiveness of this formulation to inhibit corrosion of galvanized metal.

TABLE 6

| Example | Hours | Substrate | NSS % WR | NSS % BR | QCT % WR | CoKF |
|---|---|---|---|---|---|---|
| 5 | 432 | Galvalume ® | 0.0 | 1.67 | 0 | 0.52 |
| 5 | 264 | HDG | 3.0 | — | — | 0.62 |
| 5 | 432 | HDG | 21.7 | — | 0 | — |
| 6 | 960 | Galvalume ® | 5.0 | 5.0 | 1 | 0.17 |
| 6 | 0 | HDG | — | — | — | 0.12 |

In Table 6 it was also noted that while the Example 5 formulation had little effect on the lubricity of the treated panel (evaluated after processing, compare to data in Table 5), the addition of the Jeffamine® XTJ-506 in Example 6 imparted lubricity characteristics comparable to commercially available chrome based programs.

Example 7

Cold Roll Steel (CRS) and Electrogalvanized (EG) test panels cleaned as described in Example 2 were spray treated with a 1-liter solution containing 0.175 g of the phosphonomethylated polyamine compound of Example 6, 1.5 g of 45 wt % aqueous fluozironic acid, 0.12 g titanium (IV) isopropoxide, 0.7 g of 66 wt % aqueous calcium nitrate, 0.225 g of sodium nitrobenzensulfonate, and adjusted to pH 4.8 with 26 Be ammonium hydroxide. The treated panels were then rinsed with DI water, dried in a conveyer oven, and then painted with Polycron III. The treated panels were evaluated in Neutral Salt Spray (NSS) test according to ASTM B-117 and rated at various time intervals according to ASTM D-1654. Reverse Impact Adhesion performance was also conducted in accordance with and ATSM D2794-93 and rated by summing the averages of results achieved at 40" pound and 120" pound (20 rating=no paint loss). The results of this testing are summarized in Table 7 and are comparable to commercial iron phosphate conversion coating treatments.

TABLE 7

| | CRS | EG |
|---|---|---|
| Reverse Impact | 8.7 | 18.0 |
| NSS, 96 Hours | 1.05 mm | 1.14 mm |
| NSS, 240 Hours | 2.35 mm | 1.95 mm |

It is evident that the phosphonomethylated polyamines of the invention are reaction products of an amine, as set forth above, and bridging reagent "X" as set forth above. The resulting intermediate is then reacted with $H_3PO_4$ and formaldehyde to form the desired phosphonomethylated polyamine.

While the invention has been described with respect to particular embodiments, it is apparent that numerous other forms and modifications of the inventions will be obvious to those skilled in the art. The appended claims and this invention generally should be construed to cover all such obvious forms to those skilled in the art. The appended claims and this invention generally should be construed to cover all such obvious forms and modifications which are within the true spirit and scope of the present invention.

What is claimed is:

1. A method of forming a conversion or passivation coating on a metal surface comprising contacting said metal surface with an aqueous treatment composition comprising (a) a phosphonomethylated polyamine.

2. A method of forming a conversion or passivation coating on a metal surface comprising contacting said metal surface with an aqueous treatment composition comprising (a) a phosphonomethylated polyamine, (b) a fluoacid, (c) a silane, and (d) an inorganic phosphorus acid.

3. A method as recited in claim 2 wherein said metal surface is a zinc coated metal surface.

4. A method as recited in claim 2 wherein said metal surface is galvanized steel.

5. A method as recited in claim 2 wherein said metal surface is zinc-aluminum alloy steel.

6. A method as recited in claim 2 wherein said aqueous treatment composition is chromate free.

7. A method as recited in claim 2 wherein said fluoacid (b) is $H2TiF_6$.

8. A method as recited in claim 2 wherein said inorganic phosphorus acid (d) is $H_3PO_4$.

9. A method as recited in claim 2 wherein said silane (c) is an aminosilane or an alkoxysilane.

10. A method of treating a metal surface to form a conversion or passivation coating of greater than about 1 mg per square foot on said surface, said method comprising contacting said metal surface with an aqueous treatment composition comprising: (a) phosphonomethylated polyamine, (b) a fluoacid, (c) a silane, and (d) an inorganic phosphorus acid.

11. Method as recited in claim 10 wherein said metal surface is a galvanized steel surface.

* * * * *